United States Patent [19]

Deane et al.

[11] 4,037,191
[45] July 19, 1977

[54] AIRCRAFT WARNING MARKER ASSEMBLY FOR POWER LINES

[75] Inventors: Richard Deane, Rossland; Aage C. Sylvest, Castlegar, both of Canada

[73] Assignee: Cominco Ltd., Vancouver, Canada

[21] Appl. No.: 729,607

[22] Filed: Oct. 4, 1976

[51] Int. Cl.² .......................... G08G 5/00; B64F 1/18
[52] U.S. Cl. ..................................... 340/28; 240/1.2; 340/114 R; 340/331; 340/333
[58] Field of Search ............... 340/28, 114 R, 114 B, 340/119, 331, 333, 310 R; 240/1.2, 2 R; 116/28 R; 244/114 R; 174/40 R, 127, 140 CR

[56] References Cited

U.S. PATENT DOCUMENTS

| | | | |
|---|---|---|---|
| 1,820,534 | 8/1931 | Francotte | 340/28 |
| 2,095,306 | 10/1937 | Austin | 340/28 |
| 3,124,712 | 3/1964 | Alexander | 240/1.2 |

FOREIGN PATENT DOCUMENTS

| | | | |
|---|---|---|---|
| 284,603 | 10/1928 | United Kingdom | 240/1.2 |

Primary Examiner—John W. Caldwell
Assistant Examiner—James J. Groody

[57] ABSTRACT

Aircraft warning marker assemblies for marking power transmission lines are often suspended from the power line itself and are in a few cases equipped with a flashing light energized with power obtained from the power line. The assemblies have in the past been subject to physical failure caused by wind induced vibrations in addition to damage from corona discharges and tracking over non conductive parts. The present invention discloses means for alleviating these problems. The marker assembly, which is made up of a cone-like structure supported by a hanger system, employs vibration absorbing means between the hanger system and the cone-like structure to dampen vibrations of the marker assembly, and thereby reduces the possibility of physical damage from the wind. In addition, a ring of electrically conductive material at the bottom of the cone functions as a "corona ring" in shielding the assembly from corona effects and tracking.

8 Claims, 4 Drawing Figures

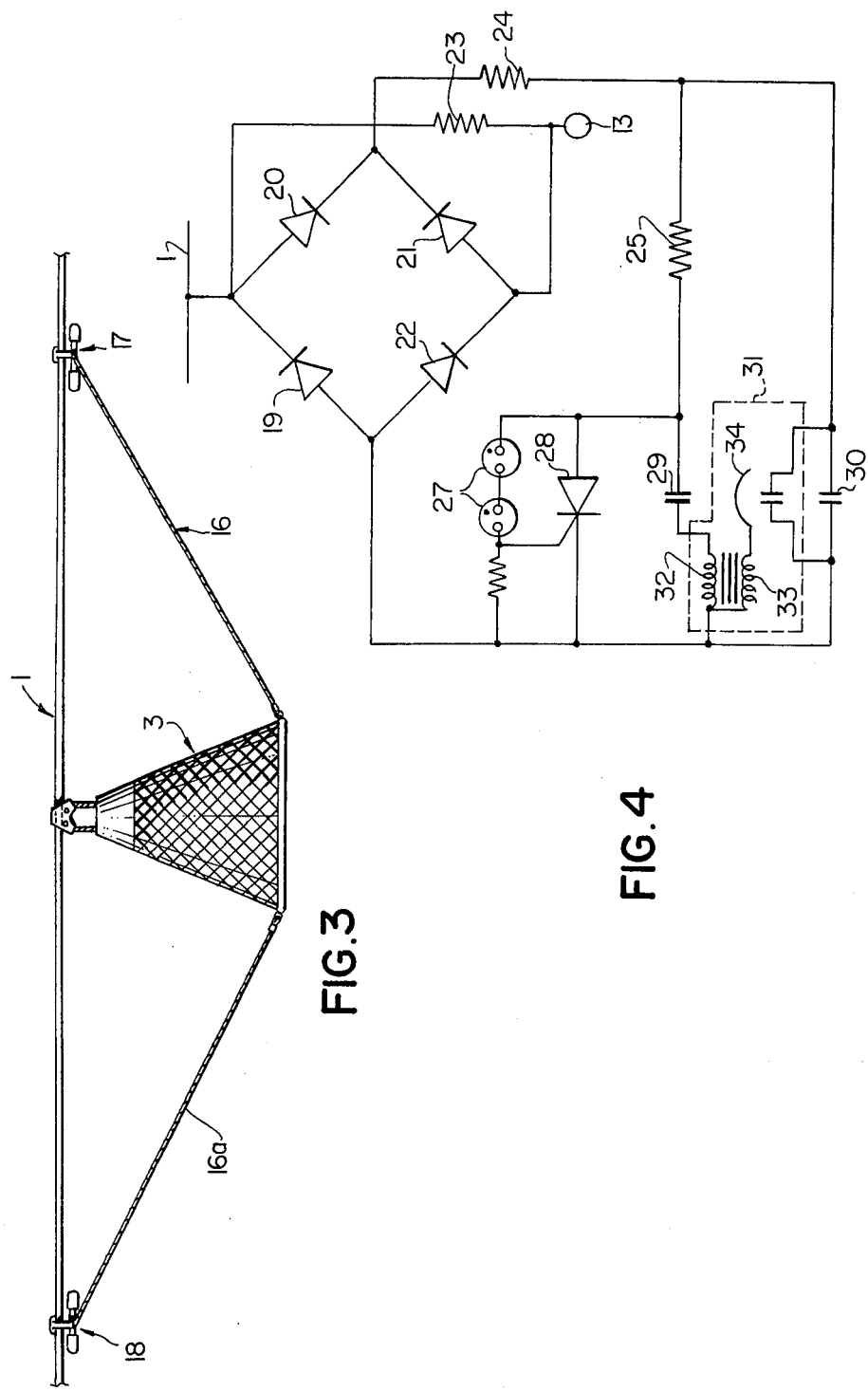

AIRCRAFT WARNING MARKER ASSEMBLY FOR POWER LINES

BACKGROUND OF THE INVENTION

The present invention discloses an improved aircraft warning marker assembly for use in warning low flying aircraft of the presence of power lines.

Many previous devices for marking the presence of transmission lines have been supported and energized from the line itself. Of these some have been clamped to the line while others have been suspended freely from it. Sometimes the above mentioned devices have included a flashing light attached to an assembly shaped so that the light is visible from all angles. None of these devices discloses a method for rendering harmless the vibrations of the assembly normally induced by wind, or a method for preventing corona effects and avoiding damage to the structure when surface arcing takes place on non-conductive surfaces of the assembly.

SUMMARY OF THE INVENTION

The invention disclosed herein incorporated means for alleviating all of the above difficulties. The present marker asssembly is comprised of a cone, a hanger system, and optionally, a flashing light. The cone which is supported from the hanger system, is made up of a framework of conductive (e.g. aluminum) ribs between which plastic panels are fitted. At the bottom of the cone is a "corona ring" made up of a length of conductive tubing bent in the shape of a ring. This "corona ring", which also may be of aluminum, prevents visible corona effects and, in addition by charging the plastic panels along their lower edge, prevents damage to the panels caused by tracking (surface arcing) under both wet and dry conditions.

The hanger system consists of a clamp, one end of which rigidly attaches to the power line and the other end of which has guided through it in semi-circular fashion a flexible steel cable, the two ends of which hang down in parallel and each pass through and support insulating tubing and vibration absorbing means before terminating. The vibration absorbing means resting on the cable-ends provide vertical support for the remainder of the assembly consisting of a cone-shaped structure and insulate the structure from the power line at this point. Vibration of the cone structure is dampened by these vibration absorbing means and can, therefore, cause no damage to the assembly. A flashing light, which may be mounted on top of the cone, is operated by a rectifier-condenser circuit energized by the power line in conjunction with the framework and the corona ring acting as capacitor.

Thus, in accordance with the broadest aspect of the invention, there is provided a warning marker assembly for attachment to a power transmission line comprising a clamp that rigidly fastens to the power line and supports an inverted U-shaped flexible steel cable having two ends which hang down in parallel and each pass through an insulating tube and vibration absorbing means, each of said ends having an abutment to support the insulating tube and vibration absorbing means, said assembly also including a truncated cone-shaped structure having an electrically conductive framework including a top plate supported by said vibration absorbing means, a bottom ring, and a plurality of ribs interconnecting the top plate and bottom ring, said framework supporting a plurality of plastic panels each extending between adjacent ribs and fitting into slots in said ribs, said assembly including an electrically conductive connection between the cable and the electrically conductive framework.

BRIEF DESCRIPTION OF THE DRAWING

FIG. 3 shows a tether rope arrangement for the marker assembly;

FIG. 4 is a diagram of the flashing light circuit.

DESCRIPTION OF THE PREFERRED EMBODIMENT

Figure 1:
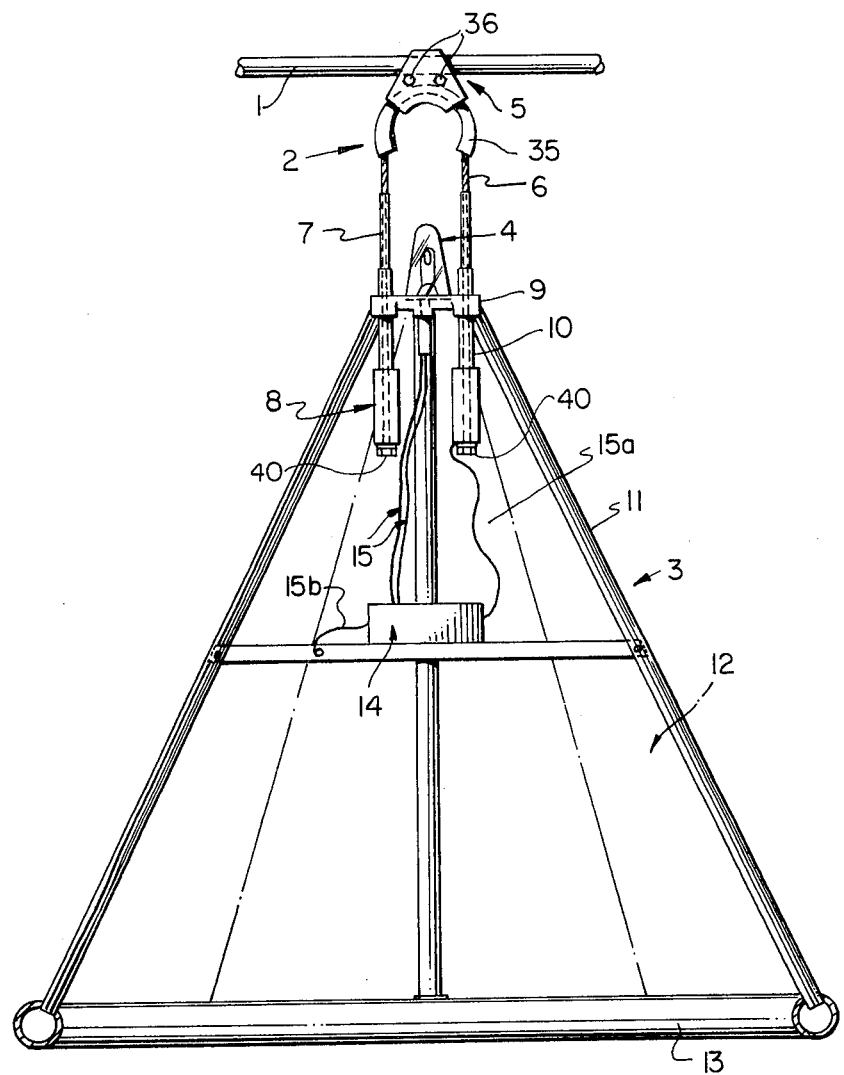
FIG. 1 is an elevation view of the marker assembly suspended from a power transmission line.

The complete assembly seen in FIG. 1 suspended from a transmission line 1 consists of a hanger system 2, a truncated cone-shaped structure 3, and a flash lamp 4. The hanger system 2 which supports the whole assembly is comprised of a clamp 5 which fixedly attaches to a power transmission line 1 at one end and freely supports a steel cable 6 that has been guided through a semi-circular channel 35 in the clamp at the other end. The clamp 5 comprises two complementary halves with nut and bolt fasteners 36 for securing the clamp to the transmission line 1 and the semicircular channel 35 which may be formed of aluminum conduit partly slit lengthwise along its outer circumference and bent outwardly to loosely accommodate the inverted U-shaped flexible steel cable 6. The two ends of the steel cable 6 hang down in parallel fashion from the clamp 5 and are each guided through an insulating tube 7 made of, for example, plastic or porcelain and vibration absorbing means 8 before being terminated in an abutment 40.

Figure 2:
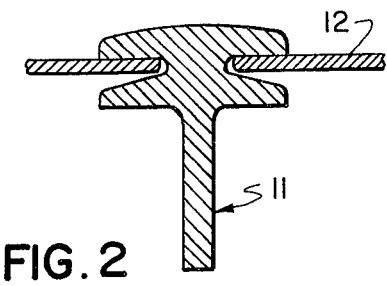
FIG. 2 is a cross sectional view of the cone's aluminum ribs.

The insulating tubes 7 pass through holes in top plate 9 which are vertically aligned with the two parallel ends of the steel cable 6. The top plate 9, which is an aluminum casting and forms part of the cone, rests on a second set of insulating tubes 10 which fit over the first set 7 and are vertically supported by the vibration absorbing means 8. Attached to a number of equispaced lugs on the bottom of the top plate 9 are extruded aluminum ribs 11, which form an electrically conductive framework. The aluminum ribs 11 are slotted on two sides, as shown in FIG. 2, to allow the insertion of plastic panels 12, which are extended between the ribs so that the combination of ribs and panels forms the cone-shaped structure 3. The cone 3 is terminated at its base by a large ring of conductive material, for example, aluminum tubing, called a corona ring 13. The aluminum ribs 11 are fastened to ring 13. Seated on top plate 9 is a flash lamp 4 electrically connected by lead wires 15 through a hole in the center of the casting to a rectifier-condenser circuit 14. A power lead 15a from the transmission line is taken off the end of the steel cable 6 to the rectifier-condenser circuit, while a lead 15b connects the circuit to the aluminum framework of the cone 3.

Steel cable 6 must be flexible and must not be able to kink or be subjected to sharp angles. The ends of the semi-circular channel 35 of the clamp 5 are therefore flared, or slit and bend out. The contained angle of the semi-circular channel may be from about 180° to 270°. Wind induced vibrations of the power line 1 are rendered harmless by the absorbing qualities of vibration absorbing means 8 which means 8 may consist of springs, springs and dash-pots or, preferably, pads, rings or sleeves made of a flexible material such as, for example, sponge rubber. Thus, physical damage to the structure caused by such vibrations is avoided.

Under natural conditions of wind, moisture and temperatures, high voltage gradients can occur on the assembly and, when sufficiently high, discharges may occur in the form of tracking. Tracking occurs at places on the non conducting parts of the assembly at boundaries between wet and dry areas and at boundaries between two different materials of constuction. The corona ring 13 and the aluminum ribs 11, which provide a conductive encasing for the plastic panels, provide a shielding effect which prevents localized build up of electrostatic charges on the assembly and consequent damage to the plastic panels from any resulting discharge. The diameter of the corona ring is variable and must be chosen in relation to the voltage carried by the transmission line. For example, the aluminum tubing of the ring has a diameter of 3 inches for an assembly used on a transmission line carrying 500 kilovolt and 1½ inches for one carying 170 kilovolt.

The use of plastic for the panels 12, provides a light weight material which can be brightly colored and resist fading for long periods to maintain maximum visibility.

Although FIG. 1 illustrates the marker assembly equipped with a flashing light, it is understood that the assembly can be used without a light and its supporting circuit. Where flashing lights are not used, conducting electrical connection must be provided, e.g. from one end of the hanger cable to the metallic framework of the cone. Assemblies with lights are especially useful on long spans of power transmission lines where lights on the supporting towers are considered inadequate due to the large distance between them.

Additional wind protection may be provided, if so desired, by the tether rope arrangement illustrated in FIG. 3 When the wind direction is close to the axis of the transmission line, it is possible for the marker assembly to be repeatedly blown into contact with the power line with resulting damage to both power line and marker assembly. To prevent this, two nonconductive ropes 16 and 16a tied at one end to diametrically opposed sides of the corona ring and fastened at the other end to the power line 1 by means of suitable clamps 17 and 18 prevent swing of the assembly along the power line axis.

The corona ring 13 and framework also serve as one side of a capacitor insulated from the transmission line so that the alternating current between them and the line can be rectified and used to charge a condenser as shown in FIG. 4. Current conduction occurs at 60 Hertz between the power line and the cone. The resistor 23 acts as a current bypass to prevent damage to the rectifier condenser circuit in cases of high line voltage and its resistance value determines the flashing rate of the lamp. The diode bridge consisting of diodes 19, 20, 21, and 22, rectifies the alternating current between framework of the cone and corona ring, and the power line. The rectified current then charges up capacitors 29 and 30 through resistors 24 and 25. When the voltage across capacitor 29 reaches the combined breakdown voltage of the neon tubes 27, the silicon controlled rectifier (SCR) 28 is triggered on and produces a current discharge through the primary 32 of an internal trigger transformer in the gas discharge flash lamp 31. The discharge causes a high voltage to be generated in the secondary winding 33 of the transformer which is applied to the trigger electrode 34 of the flash lamp 31 which fires the lamp. At the same time, capacitor 30 discharges through the lamp which results in a bright light-flash of short duration. Resistor 25 isolates capacitor 30 from the SCR circuit so that the former is not discharged by the latter's conduction.

The corona ring has a dual function. It serves to prevent so called corona which affects radio communication by interference, which is objectionable. Secondly, the ring serves as a bottom support for the plastic panels and also causes the lower edge of the panels to be charged to the same potential as the edges enclosed in the ribs, thus preventing high voltage gradients over the plastic surface which, in other designs, have resulted in destructive arcing over the plastic surface. The size of the aluminum tubing of the ring is determined by the voltage carried by the power line. The higher the line voltage, the greater the corona problem and thus the larger the size of the tubing which is required to prevent corona. A higher line voltage also results in a higher charging current in the rectifier-condenser circuit and increases the flashing rate of the lamp.

The above described assembly represents only one possible embodiment. Other obvious configurations possible without departing from the spirit of the invention include for example a bell-shaped or a spherical-shaped structure in place of a cone-shaped one.

While the corona ring and framework have been stated to be of aluminum this is not essential although it is a preferred material, being both light weight and a good conductor.

What we claim as our invention is:

1. A warning marker assembly for attachment to a power transmission line comprising a clamp that rigidly fastens to the power line and supports an inverted U-shaped flexible steel cable having two ends which hang down in parallel and each pass through an insulating tube and vibrations absorbing means, each of said ends having an abutment to support the insulating tube and vibration absorbing means, said assembly also including a truncated cone-shaped structure having an electrically conductive framework including a top plate supported by said vibration absorbing means, a bottom ring, and a plurality of ribs interconnecting the top plate and bottom ring, said framework supporting a plurality of plastic panels each extending between adjacent ribs and fitting into slots in said ribs, said assembly including an electrically conductive connection between the cable and the electrically conductive framework.

2. A device as claimed in claim 1, wherein said conductive connection is via a flash lamp installed on said top plate.

3. A device as claimed in claim 2, wherein said conductive connection energizes a rectifier-condenser circuit which operates the flash lamp.

4. A device as claimed in claim 1, wherein the bottom ring is made of aluminum tubing.

5. A device as claimed in claim 1, wherein the top plate and the ribs are formed of aluminum.

6. A device as claimed in claim 1, wherein attached to the base of the cone at diametrically opposed sides are ropes each of which are attached at their other ends to the transmission line such that the two ropes are tied to opposite sides to the transmission line with respect to said warning marker assembly.

7. A device as claimed in claim 1, wherein the vibration absorbing means consist of pads, rings or sleeves of a flexible material.

8. A device as claimed in claim 7, wherein the flexible material is sponge rubber.

* * * * *